United States Patent [19]

Tabor et al.

[11] Patent Number: 4,739,017

[45] Date of Patent: Apr. 19, 1988

[54] RETRO DIELS ALDER ASSISTED POLYMER GRAFTING PROCESS

[75] Inventors: Ricky L. Tabor; Paul L. Neill, both of Lake Jackson; Bradley L. Davis, Brazoria, all of Tex.

[73] Assignee: The Dow Chemical Company, Midland, Mich.

[21] Appl. No.: 871,741

[22] Filed: Jun. 6, 1986

[51] Int. Cl.$^4$ .................. C08L 51/04; C08L 51/06
[52] U.S. Cl. ...................... 525/300; 525/279; 525/288; 525/285; 525/289; 525/293; 525/295; 525/297; 525/298; 525/299; 525/316; 525/319
[58] Field of Search ............... 525/300, 289, 285, 301, 525/299, 293, 297, 319

[56] References Cited

U.S. PATENT DOCUMENTS

| | | | |
|---|---|---|---|
| 3,035,008 | 5/1962 | Gaylord | 525/289 |
| 3,803,092 | 4/1974 | Cesca et al. | 260/66 |
| 3,846,387 | 11/1974 | Su et al. | 260/80.78 |
| 3,873,643 | 3/1975 | Wu et al. | 260/878 |
| 3,882,194 | 5/1975 | Krebaum et al. | 260/878 |
| 4,039,491 | 8/1977 | Okeda et al. | 525/289 |
| 4,452,942 | 6/1984 | Shida et al. | 525/74 |

Primary Examiner—Carman J. Seccuro
Attorney, Agent, or Firm—Daniel N. Lundeen

[57] ABSTRACT

A retro Diels Alder assisted polymer grafting process in which a Diels Alder adduct is mixed with a polyolefin or polyvinyl polymer substrate and thermally decomposed to form an ethylenically unsaturated monomer which grafts onto the polymer substrate. The monomer conforms generally to the formula $R_1R_2C=CHR_3$ in which $R_1$ is hydrogen, methyl or ethyl, $R_2$ is hydrogen, methyl, ethyl or vinyl and $R_3$ is a hydroxyl, carboxyl, cyano, formyl, acetyl or propanoyl. The Diels Alder adduct substantially decomposes at a temperature of about 120°–300° C., but does not substantially decompose below about 120° C. The polymer substrate is preferably high-density polyethylene, low density polyethylene, linear low density polyethylene, ethylene-propylene rubber, polypropylene, polystyrene or styrene-butadiene block copolymers. The grafting is induced by, for example, heat, catalyst and/or high shear conditions. Optionally, the polymer mixture is devolatilized to remove any unreacted Diels Alder adduct and decomposition products thereof.

18 Claims, No Drawings

RETRO DIELS ALDER ASSISTED POLYMER GRAFTING PROCESS

FIELD OF THE INVENTION

This invention relates to a method of grafting an ethylenically unsaturated monomer onto a polyolefin or polyvinyl polymer substrate and particularly to such a method in which a Diels Alder adduct of the monomer to be grafted is employed to provide the source of the ethylenically unsaturated monomer through a retro Diels Alder mechanism.

BACKGROUND OF THE INVENTION

The grafting of ethylenically unsaturated monomers onto a molten polymer substrate with or without a free radical initiator is well known. For example, methods of grafting monomers such as maleic anhydride onto polyethylene in an extruder are described in U.S. Pat. Nos. 3,882,194 and 3,873,643.

In many applications, however, the monomer to be grafted is volatile and requires elaborate, complicated and often expensive apparatus and techniques to prevent escape of the volatile monomer from the polymer melt. Usually, the volatile monomer is both toxic and flammable, posing risks to personnel and equipment.

In addition, monomers such as acrylic acid, for example, are too reactive to be conveniently grafted to the polymer. Generally, such graft monomers will homopolymerize to an undesirable extent and not react with the polymer to be grafted to the desired extent.

Further, many monomers are not miscible or soluble in the polymer melt, resulting in poor dispersion of the monomer in the graft polymer product and considerable quantities of the monomer intended to be grafted being homopolymerized.

Further still, many monomers are liquid at room temperature and are consequently difficult to mix with a normally solid polymer substrate and too volatile to mix with a molten polymer substrate.

SUMMARY OF THE INVENTION

The present invention avoids the foregoing problems associated with the prior art by employing a Diels Alder adduct of the monomer desired to be grafted which decomposes into the monomer to be grafted and conjugated diene at the grafting conditions.

The present invention is a method of grafting ethylenically unsaturated monomer onto polyolefin or vinyl polymer. The method includes the step of mixing polyolefin or vinyl polymer substrate with Diels Alder adduct of the ethylenically unsaturated monomer to be grafted. The Diels Alder adduct is stable below about 120° C. and substantially decomposes into conjugated diene and the ethylenically unsaturated monomer to be grafted at a temperature of from about 120° to about 300° C.

The method also includes the step of heating the polymer substrate/Diels Alder adduct mixture to a temperature of from about 120° to about 300° C. sufficient to substantially decompose the Diels Alder adduct into the conjugated diene and the ethylenically unsaturated monomer to be grafted.

The method further includes the step of inducing graft polymerization of the ethylenically unsaturated monomer onto the polyolefin or vinyl polymer substrate, thereby forming a graft polymer.

Optionally, the method may also include the step of devolatilizing the graft copolymer to remove unreacted Diels Alder adduct, conjugated diene and ethylenically unsaturated monomer therefrom.

DESCRIPTION OF THE INVENTION

In the practice of the present invention, a polymer substrate is mixed and heated with a Diels Alder adduct which decomposes upon heating into conjugated diene and ethylenically unsaturated monomer. The ethylenically unsaturated monomer produced by the decomposition of the Diels Alder adduct is then grafted onto the polymer substrate. If desired, any unreacted Diels Alder adduct and decomposition products thereof may be removed by devolatilizing the graft polymer.

The polymers contemplated as suitable substrates in the present method include polyolefins and vinyl polymers. By way of non-limiting examples, polyolefins include homopolymers and copolymers of one or more olefins such as ethylene, propylene, 1-butene, 1-pentene, 3-methyl-1-pentene, 1-hexene, 1-octene and the like. Further, the polyolefins also include olefins copolymerized with relatively minor amounts of other monomers copolymerizable therewith, such as, for example: vinyl aryls such as styrene, substituted styrenes, vinyl napthalene and the like; vinyl and vinylidene halides such as vinyl chloride, vinylidene bromide and the like; vinyl esters such as vinyl acetate, vinyl propionate, vinyl chloroacetate and the like; acrylic and $\alpha$-alkyl acrylic acids, and the alkyl esters, amides and nitriles thereof, such as acrylic acid, chloroacrylic acid, methacrylic acid, methyl acrylate, acrylamide, N-methyl acrylamide, acrylonitrile, chloroacrylonitrile, methacrylonitrile and the like; alkyl esters of maleic and fumaric acid such as dimethyl maleate, diethyl fumarate and the like; vinyl alkyl ethers and ketones such as vinyl methyl ether, vinyl ethyl ether, 2-chloroethyl vinyl ether, methyl vinyl ketone, ethyl vinyl ketone and the like; and other copolymerizable monomers such as carbon monoxide and the like.

Preferred polyolefins include low density polyethylene, high density polyethylene, linear low density polyethylene, ethylene-propylene rubbers and polypropylene.

By way of non-limiting example, the contemplated suitable vinyl polymers include homopolymers and copolymers of one or more vinyl compounds such as: vinyl aryls such as styrene, substituted styrenes, vinyl napthalene and the like; vinyl and vinylidene halides such as vinyl chloride, vinylidene chloride, vinylidene bromide and the like; vinyl esters such as vinyl acetate, vinyl propionate, vinyl chloroacetate and the like; acrylic and $\alpha$-alkyl acrylic acids, and the alkyl esters, amides and nitriles thereof, such as acrylic acid, chloroacrylic acid, methacrylic acid, methyl acrylate, acrylamide, N-methyl acrylamide, acrylonitrile, chloroacrylonitrile, methacrylonitrile and the like; and vinyl alkyl ethers and ketones such as vinyl methyl ether, vinyl ethyl ether, 2-chloroethyl ether, methyl vinyl ketone, ethyl vinyl ketone and the like. Further, the vinyl polymers also include vinyl compounds copolymerized with relatively minor amounts of other monomers copolymerizable therewith such as, for example: olefins such as ethylene, propylene, 1-butene and the like; alkyl esters of maleic and fumaric acid such as dimethyl maleate, diethyl fumarate and the like; and other copolymerizable monomers such as carbon monoxide and the like.

Preferred vinyl polymers include polystyrene and block copolymers of styrene and butadiene.

The Diels Alder adducts contemplated as suitable in the method include those which decompose upon heating into conjugated diene and ethylenically unsaturated monomer. The Diels Alder adduct must not substantially decompose below about 120° C. in order to permit adequate mixing of the Diels Alder adduct with the polymer substrate before grafting, and must substantially decompose below about 300° C. to avoid degradation of the substrate polymer. As used herein with respect to the Diels Alder adduct, the phrase "not substantially decomposed" means that not more than about 10% is decomposed into the diene and carbonyl monomer constituents, and the phrase "substantially decomposed" means that at least 90% of the adduct is so decomposed.

The Diels Alder adduct is preferably also substantially nonvolative below about 120° C. to further facilitate blending of the adduct with the polymer substrate. As used herein, the term "nonvolatile" means having a vapor pressure of about 0.5 atm or less at the specified temperature.

The thermal decomposition products of the Diels Alder adduct include conjugated diene and ethylenically unsaturated monomer. Contemplated suitable diene decomposition constituents include, for example: acyclic dienes such as 1,3-butadiene, isoprene, 1,3-pentadiene, 1,3-hexadiene, 2,4-hexadiene, 1,3,5-hexatriene and the like; cyclic dienes such as 1,3-cyclopentadiene, 1,3-cyclohexadiene, 1-methyl-1,3-cyclohexadiene, 5-methyl-1,3-cyclohexadiene, and the like; and heterocyclic dienes such as furan, thiophene and the like.

Contemplated ethylenically unsaturated monomers produced from thermal decomposition of the Diels Alder adduct generally conform to the formula $R_1R_2C=CHR_3$ wherein $R_1$ is hydrogen, methyl or ethyl, $R_2$ is hydrogen, methyl, ethyl or vinyl, and $R_3$ is hydroxyl, carboxyl, cyano, formyl, acetyl, propanoyl, phenyl, trialkoxysilyl, hydroxyphenyl, isocyanato, pyridinyl or amino.

Specific representative examples of ethylenically unsaturated monomers produced from the thermal decomposition of the Diels Alder adduct include: conjugated ethylenically unsaturated carboxylic acids such as acrylic acid, methacrylic acid, ethacrylic acid, chloroacrylic acid, crotonic acid, angelic acid, senecoic acid, β-vinylacrylic acid, fumaric acid, itaconic acid, glutaconic acid, and the like; conjugated ethylenically unsaturated carboxylic acid anhydrides such as maleic anhydride, itaconic anhydride, glutaconic anhydride, and the like; and alkyl vinyl ketones such as methyl vinyl ketone, ethyl vinyl ketone, and the like.

The Diels Alder adduct may generally be prepared by reacting the conjugated diene and the ethylenically unsaturated monomer under reaction conditions effective to form the adduct.

Specific representative examples of suitable Diels Alder adducts and their respective conjugated diene and ethylenically unsaturated monomer thermal decomposition products are listed in Table I.

TABLE I

| Adduct | Decomposition Products | |
|---|---|---|
| | Diene | Monomer |
| 5-norbornene-2-acrylic acid | cyclopentadiene | β-vinylacrylic acid |
| 1-methoxybicyclo[2.2.2] | 1-methoxy-1,3- | vinyl methyl ketone |

TABLE I-continued

| Adduct | Decomposition Products | |
|---|---|---|
| | Diene | Monomer |
| oct-5-en-2-yl methyl ketone | cyclohexadiene dimer | |
| 5-norbornene-2-carboxylic acid | 1,3-cyclopentadiene dimer | acrylic acid |

The mixing of the polymer substrate and the Diels Alder adduct may be accomplished in either solid or molten form as by, for example, dry blending, Banbury mixing, in a roll mill, in a mixing extruder, or the like. Masterbatches which contain a relatively high percentage of the Diels Alder adduct in a polymer substrate may also be employed by mixing the masterbatch with the polymer substrate to obtain the desired proportion of Diels Alder adduct. Preferably, the mixing is done at a temperature below which the Diels Alder adduct is volatile and below which the Diels Alder adduct is not substantially decomposed.

The mixture is then heated to a temperature at which the Diels Alder adduct substantially decomposes into the diene and monomer constituents, but not above about 300° C. in order to avoid degradation of the polymer substrate. Preferably, the temperature to which the mixture is heated is from about 150° to about 250° C.

Graft polymerization of the monomer onto the polymer substrate in the molten mixture is then induced by the heating alone, but is preferably induced by the heating in the presence of a free-radical catalyst such as air, peroxides or actinic light, and more preferably also under high shear conditions.

The mixing, heating and inducing graft polymerization is preferably done simultaneously, either on a batch or continuous basis. In a preferred embodiment, the process is effected with a screw-type extruder.

Generally, from about 0.2 to about 5 parts by weight of the Diels Alder adduct are mixed with 100 parts by weight of the polymer substrate, preferably from about 1 to about 3 parts by weight of the adduct per 100 parts polymer substrate.

EXAMPLE 1

Using a Haake Buchler Rheocord System 40 mixing device, 40 g of an ethylene-octene LLDPE having a density of about 0.920 g/cc and a melt index of 6.6 were fluxed in the mixing head at 50 rpm at a temperature of 220° C. Over a period of 1 minute, 8.2 mg-moles of 5-norbornene-2-carboxylic acid and 30 μl (2.8 mg) of 2,5-dimethyl-2,5-di(t-butyl peroxy)hex-3-yne were added to the fluxing LLDPE with a syringe through an injection ram modified for this purpose. The mixer speed was then increased to 200 rpm for 6 minutes. The graft copolymer product was then removed from the mixer and cooled.

The graft copolymer product was dissolved in xylene at 10° C., precipitated with acetone, filtered, and dried in a vacuum oven at 60° C. for 14 hours to remove residual low molecular weight materials. By titration in 3:1 xylene/butanol with tetra-n-butyl ammonium hydroxide (1.0M in methanol) using thymol blue as an indicator, the graft copolymer product had an acrylic acid content of 0.27 wt.%.

The above procedure was repeated except that 8.2 mg-moles of acrylic acid were used instead of 5-norborene-2-carboxylic acid. The resulting graft copolymer had an acrylic acid content of 0.24 wt.%. This example demonstrates that equivalent grafting of a conjugated ethylenically unsaturated carbonyl such as acrylic acid may be achieved by using a Diels Alder adduct thereof.

EXAMPLE 2

Using a Brabender mixer capable of mixing aliquots of up to 50 g of polymer, 40 g of HDPE (0.962 g/cc, melt index 10) were added to the mixing head and allowed to melt for about 30 seconds at 175° C. at 200 rpm. Over a period of 30 seconds, 21.7 mg-moles of 5-norbornene-2-carboxylic acid were injected into the mixing chamber. After allowing 15 seconds for mixing, 50 μl of a 50 wt.% solution of dicumyl peroxide in methyl ethyl ketone were injected. After mixing an additional 3 minutes, the grafted copolymer was removed from the chamber and allowed to cool.

The graft copolymer product was dissolved in xylene at 100° C., precipitated with acetone, filtered and dried in a vacuum oven at 70° C. for 14 hours to remove residual low molecular weight materials. By infrared spectroscopy, the incorporated acrylic acid content was determined to be about 0.14% by weight. The graft copolymer had a melt index of 4.08.

The above procedure was repeated except that 21.7 mg-moles of acrylic acid were used instead of the 5-norbornene-2-carboxylic acid. The resulting graft copolymer had an acrylic acid content determined by infrared spectroscopy of about 0.27 wt.%. However, the melt index of this material was 0.88, indicating that substantially more crosslinkage occurred when acrylic acid was used instead of the Diels Alder adduct thereof.

EXAMPLE 3

The procedure of Example 2 was repeated with 24.9 mg-moles of 1-methoxybicyclo[2.2.2]oct-5-ene-2-yl methyl ketone instead of 5-norbornene-2-carboxylic acid, and 100 μl of 2,5-dimethyl-2,5-di(t-butylperoxy)- hex-3-yne were added in place of the 50 wt.% dicumyl peroxide in methyl ethyl ketone. By IR spectroscopy, the resulting graft copolymer contained about 0.15% vinyl methyl ketone by weight.

EXAMPLE 4

To demonstrate that various Diels Alder adducts are suitably employed in the present method, the IR absorption of various Diels Alder adducts were determined and compared with the saturated Diels Alder adduct and with graft HDPE copolymers thereof. The monomers were grafted to high density polyethylene (0.954 gcc, 5 melt index) in a Haake Buchler System 40 mixing device by introducing 38 g of the HDPE into the mixing head at 300° C.

Following a one minute melt time, 204 mg-moles of the Diels Alder adduct (or maleic anhydride monomer) to be examined were added to the mixing head and mixed with the HDPE for 15 minutes at 250 rpm rotor speed. The graft copolymer was then removed from the chamber, cooled, dissolved in hot 1,2,4-trichlorobenzene at 2 wt.%, precipitated with an equal volume of 2-butanone, filtered and dried in a vacuum oven to substantially remove residual monomer. The graft copolymers were then analyzed by infrared spectroscopy to determine the peak carbonyl absorption wavelengths. The data is presented in Table II along with the peak carbonyl absorption values for the adduct and the saturated adduct.

TABLE II

| Monomer No. | Adduct/ Monomer | Unsaturated Absorptions (cm$^{-1}$) | Saturated Absorptions (cm$^{-1}$) | LLDPE Graft Copolymer Absorptions (cm$^{-1}$) |
|---|---|---|---|---|
| 1 | Maleic anhydride | 1788, 1863 | 1792, 1863 | 1797, 1873.5 |
| 2 | Tetrahydrophthalic anhydride | 1780, 1847 | 1798, 1866 | — |
| 3 | Bicylo[2.2.1]hept-5-ene-2,3-dicarboxylic anhydride | 1775, 1856 | 1788, 1865 | 1795, 1872 |
| 4 | 7-Oxabicyclo[2.2.1]hept-5-ene-2,3-dicarboxylic anhydride | 1795, 1865 | 1795, 1864 | 1795.5, 1874 |
| 5 | 6-Methylbicyclo[2.2.1]-hept-5-ene-2,3-dicarboxylic anhydride | 1785, 1863 | NA | 1796, 1873 |
| 6 | Bicyclo[2.2.2]oct-5-ene-2,3-dicarboxylic anhydride | 1788, 1865 | NA | 1798, 1874 |
| 7 | 6-Methyltetrahydrophthalic anhydride | 1773, 1840 | NA | 1797, 1874 |
| 8 | Bicyclo[2.2.2]oct-7-ene-2,3,5,6-tetra-carboxylic acid dianhydride | 1780, 1860 | NA | 1778–1788, 1857 |

Note for Table II:
NA = saturated absorptions not determined

By comparing the IR absorption of various graft copolymers of Diels Alder adducts, it is seen either that the decomposition products (maleic anhydride) were grafted (as with monomers 3–7), the Diels Alder adduct itself was grafted (as with monomer 8), or the adduct did not result in any grafting at all (as with monomer 2), depending on the decomposition temperature of the adduct. It is believed that monomer No. 8 did not yield any maleic anhydride grafting because of its relatively high decomposition temperature, whereas monomer No. 2 did not graft at all because of its relative volatility.

EXAMPLE 5

A series of tests were run to demonstrate a technique for screening the suitability of proposed Diels Alder adducts for use in the present method. A 15" OV-17 gas chromatograph column was used in a Finnigan 3200 GC-MS at 100° C. A Pyroprobe pyrolysis chamber was connected to the unit as the injection point. Samples of the Diels Alder adduct to be tested were placed in quartz tubes and pyrolysis was incurred for a period of 10 seconds at a predetermined temperature. Helium flowing through the Pyroprobe chamber carried the decomposition products onto the gas chromatograph column and then to the mass spectrometer for identification. The results are presented in Table III.

TABLE III

| Diels Alder Adduct | Result of Pyrolysis |
| --- | --- |
| 5-norbornene-2-acrylic acid | Decomposed into β-vinyl acrylic acid and cyclopentadiene at 200° C. |
| 1-methoxybicyclo[2.2.2]oct-5-ene-2-yl-methyl ketone | Decomposed into vinyl methyl ketone and the dimer of 1-methoxycyclohex-1,3-diene at 300° C. |
| 5-norborene-2-carboxylic acid | Decomposed into acrylic acid and the dimer of cyclopentadiene at 200° C. |
| 5-norbornene-2-carbonitrile | Stable to 300° C. |
| 5-norbornene-2-carboxaldehyde | Stable to 300° C. |
| 5-norbornene-2-ol | Stable to 300° C. |
| cyclohex-4-ene-1,2-dicarboxylic anhydride | Stable to 450° C. |
| 1-methoxybicyclo[2.2.2]oct-5-ene-2-carbonitrile | Stable between 100 and 300° C. |

Having described our invention above, many variations from the illustrated details will occur to those skilled in the art. It is intended that all such variations which fall within the scope and spirit of the appended claim be embraced thereby.

We claim:

1. A retro Diels Alder-assisted grafting method, comprising the steps of:
   (a) mixing polyolefin or vinyl polymer substrate and Diels Alder adduct, said Diels Alder adduct not substantially decomposing below about 120° C. and substantially decomposing at a temperature of from about 120° C. to about 300° C. into conjugated diene and ethylenically unsaturated monomer of the formula $R_1R_2C=CHR_3$ wherein $R_1$ is hydrogen, methyl or ethyl; $R_2$ is hydrogen, methyl, ethyl or vinyl; and $R_3$ is hydroxyl, carboxyl, cyano, formyl, acetyl, propanoyl, phenyl, trialkoxysilyl, hydroxyphenyl, isocyanato, pyridinyl or amino when $R_2$ is vinyl, and $R_3$ is hydroxyl, cyano, formyl, acetyl propanoyl, phenyl, trialkoxysilyl, hydroxyphenyl, isocyanate, pyridinyl or amino when $R_2$ is hydrogen, methyl or ethyl;
   (b) heating said mixture to a temperature of from about 120° C. to about 300° C. sufficient to substantially decompose said Diels Alder adduct into said conjugated diene and said ethylenically unsaturated monomer; and
   (c) inducing graft polymerization of said ethylenically unsaturated monomer onto said polymer substrate, thereby forming a graft copolymer.

2. The method of claim 1, wherein said polymer substrate is selected from the group consisting of high density polyethylene, low density polyethylene, linear low density polyethylene, ethylene-propylene rubber, polypropylene, polystyrene and styrene-butadiene block copolymers.

3. The method of claim 1, wherein said Diels Alder adduct undergoes said substantial decomposition at a temperature of from about 150° C. to about 250° C.

4. The method of claim 1, further comprising the step of:
   (d) devolatilizing said graft copolymer to substantially remove therefrom unreacted Diels Alder adduct and decomposition products thereof.

5. A retro Diels Alder-assisted grafting method, comprising the steps of:
   (a) mixing polymer substrate and Diels Alder adduct, said polymer substrate selected from the group consisting of: high density polyethylene, low density polyethylene, linear low density polyethylene, polypropylene, ethylene-propylene rubber, polystyrene and styrene-butadiene block copolymer; said Diels Alder adduct not substantially decomposing below about 150° C. and substantially decomposing at a temperature of from about 150° C. to about 250° C. into conjugated diene and ethylenically unsaturated monomer of the formula $R_1R_2C=CHR_3$ wherein $R_1$ is hydrogen, methyl or ethyl; $R_2$ is hydrogen, methyl, ethyl or vinyl; and $R_3$ is carboxyl, acetyl, formyl or propanoyl when $R_2$ is vinyl, and $R_3$ is formyl, acetyl, or propanoyl when $R_2$ is hydrogen, methyl or ethyl;
   (b) heating said mixture to a temperature of from about 150° C. to about 250° C. sufficient to substantially decompose said Diels Alder adduct into said conjugated diene and said ethylenically unsaturated monomer; and
   (c) inducing graft polymerization of said ethylenically unsaturated monomer onto said polymer substrate, thereby forming a graft copolymer.

6. The method of claim 5, wherein said ethylenically unsaturated monomer is β-vinylacrylic acid.

7. The method of claim 6, wherein said Diels Alder adduct is 5-norbornene-2-acrylic acid.

8. The method of claim 5, wherein said ethylenically unsaturated monomer is vinyl methyl ketone.

9. The method of claim 8, wherein said Diels Alder adduct is 1-methoxybicyclo[2.2.2]oct-5-ene-2-yl methyl ketone.

10. A retro Diels Alder-assisted grafting method, comprising the simultaneous steps of:
    (a) mixing at a high shear rate in the presence of free radical catalyst:
       (i) polymer substrate selected from the group consisting of: high density polyethylene, low density polyethylene, linear low density polyethylene, polypropylene, ethylene-propylene rubber, polystyrene and styrene-butadiene block copolymer; and
       (ii) from about 0.1 to about 10 parts by weight, per 100 parts by weight of said polymer substrate of Diels Alder adduct selected from the group consisting of: 5-norbornene-2-acrylic acid and 1-methoxybicyclo[2.2.2]oct-5-ene-2-yl methyl ketone;
    (b) heating said mixture to a temperature of from about 150° C. to about 250° C. sufficient to substantially decompose said Diels Alder adduct into conjugated diene and ethylenically unsaturated monomer selected from the group consisting of: β-vinyl acrylic acid and vinyl methyl ketone; and (c) inducing graft polymerization of said monomer onto said polymer substrate, thereby forming a graft copolymer.

11. The method of claim 10, wherein said Diels Alder adduct is 5-norbornene-2-acrylic acid.

12. The method of claim 10, wherein said Diels Alder adduct is 1-methoxybicyclo[2.2.2]oct-5-ene-2-yl methyl ketone.

13. The method of claim 10, further comprising the step of devolatilizing said graft copolymer to remove therefrom unreacted Diels Alder adduct and decomposition products thereof.

14. The method of claim 13, wherein said steps are effected on a batch basis.

15. The method of claim 13, wherein said steps are effected on a continuous basis.

16. The method of claim 15, wherein said steps are effected with a screw-type extruder.

17. The method of claim 10, wherein from about 0.2 to about 5 parts by weight of said Diels Alder adduct are mixed with 100 parts by weight of said polymer substrate.

18. The method of claim 10, wherein from about 1 to about 3 parts by weight of said Diels Alder adduct are mixed with 100 parts by weight of said polymer substrate.

* * * * *